C. W. THOMAS.
PROCESS AND APPARATUS FOR MANUFACTURING STONE.
APPLICATION FILED JUNE 17, 1910.

1,093,363.

Patented Apr. 14, 1914.

WITNESSES:
Jos. R. Denny
John C. Howard

INVENTOR
Charles W. Thomas
BY
Charles N. Butler
ATTORNEY.

UNITED STATES PATENT OFFICE.

CHARLES W. THOMAS, OF LAUREL SPRINGS, NEW JERSEY, ASSIGNOR TO SILICA STONE WORKS, OF PLANEBROOK, PENNSYLVANIA.

PROCESS AND APPARATUS FOR MANUFACTURING STONE.

1,093,363. Specification of Letters Patent. Patented Apr. 14, 1914.

Application filed June 17, 1910. Serial No. 567,380.

*To all whom it may concern:*

Be it known that I, CHARLES W. THOMAS, a citizen of the United States, residing at Laurel Springs, in the county of Camden and State of New Jersey, have invented an Improved Process and Apparatus for Manufacturing Stone.

My invention relates to the manufacture of stone by molding plastic material. Its leading object is to give a fine surface to a face or faces of the product by a rubbing operation in the process of molding; thus increasing the density of the outer stratum subjected to the manipulation, rearranging the irregular solid particles so that their faces rather than their angles shall be exposed and working out gases present in melted or partially melted material used in making the product.

In the practice of my process, plastic material, such as sand heated with sufficient glass to provide a binder, is pressed in a die provided with a movable side which rubs the composition as it is consolidated. The surface that has been rubbed is thus given a smooth, semi-polished or polished finish.

It is an object of my invention to provide mechanism for simultaneously effecting the operations of compressing the material and rubbing the surface to be finished thereby.

The characteristics of my improvements are fully disclosed in the following description and the accompanying drawings in illustration thereof.

Figure 4:
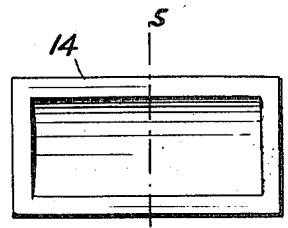
Figure 2:
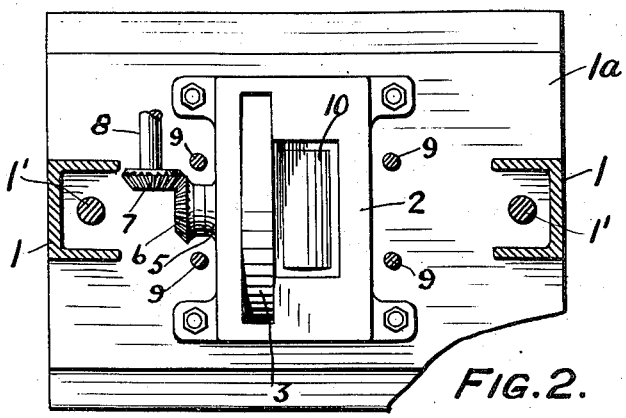
Figure 5:
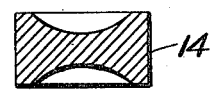
Figure 1:
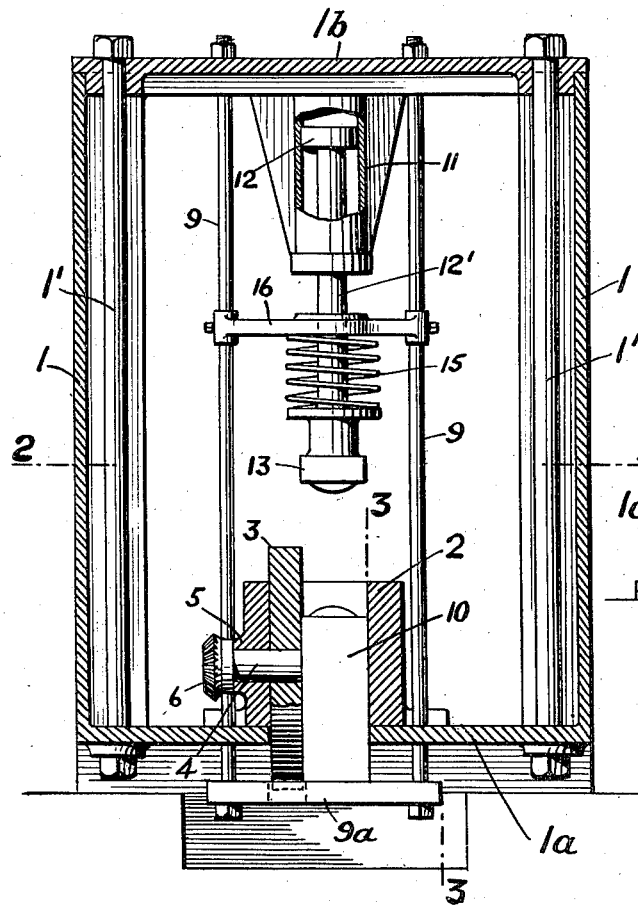
Figure 3:
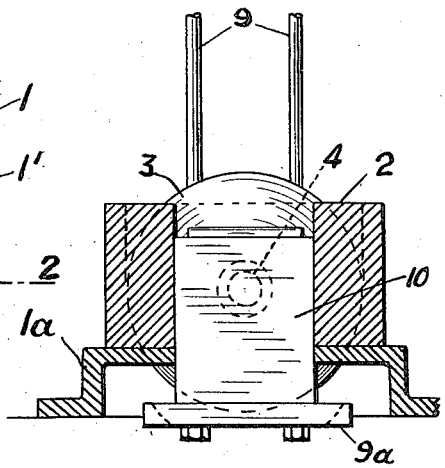

In the drawings, Figure 1 is a sectional elevation of apparatus designed for use in the practice of the process; Fig. 2 is a sectional plan view taken on the line 2—2 of Fig. 1; Fig. 3 is a sectional elevation of a die, taken on the line 3—3 of Fig. 1; Fig. 4 is a plan view of a stone made by the apparatus; and Fig. 5 is a sectional elevation taken on the line 5—5 of Fig. 4.

The apparatus comprises a frame or housing having vertical members 1 and 1' connected at their lower ends with the bottom member $1^a$ and at their upper ends with the top member $1^b$. The part $1^a$ supports a die 2 having a side thereof formed by the disk 3, the latter being fixed on the arbor 4 which is journaled in the bearing 5. The disk 3 is movable by a gear 6 fixed to the arbor 4 and meshing with the gear 7 driven by a shaft 8.

Rods 9 have a limited vertical movement through the members $1^a$ and $1^b$ and have fixed to the lower ends thereof the cross piece $9^a$ which carries an anvil 10 movable in the die and forming a bottom therefor.

A cylinder 11 is supported by the member $1^b$ and contains a piston 12 which is connected by the rod 12' with the ram 13. The ram is adapted for entering the die 2 and consolidating the plastic, preferably vitreous material placed therein upon the anvil 10 simultaneously with the rotation or oscillation of the smoothing device 3.

The stone 14 having been formed in the die and its surface to be exposed finished to the condition desired by the rubbing action of the part 3, the ram 13 is elevated and the anvil 10 rises to lift the finished product from the die. The anvil 10, which falls by its own weight and that of its supporting frame, is elevated by the engagement of a spring 15 on the piston rod 12' with a cross piece 16 fixed to the rods 9, the piston rod moving freely through the part 16 so that the ram can move through a distance considerably greater than the travel of the anvil.

Having described my invention, I claim:

1. In the manufacture of stone, the method which consists in heating sand with a fusible material so as to produce a plastic clot and then confining said clot and subjecting it while hot and plastic to pressure and a face thereof to a continuous rubbing movement in one direction.

2. In the manufacture of stone, the combination of a mold having a movable side, means for moving said side continuously in one direction, and means for simultaneously pressing material in said mold against said side.

3. In the manufacture of stone, the combination of a form having a revoluble side, means for pressing a plastic mass in said form against said side, and means for moving said side continuously in one direction.

In witness whereof I have hereunto set my name this 27th day of May, 1910, in the presence of the two subscribing witnesses.

CHARLES W. THOMAS.

Witnesses:
W. F. RITTMAN,
OSCAR GENTZSCH.